W. Read,
Cotton Press,
Nº 40,064. Patented Sept. 22, 1863.
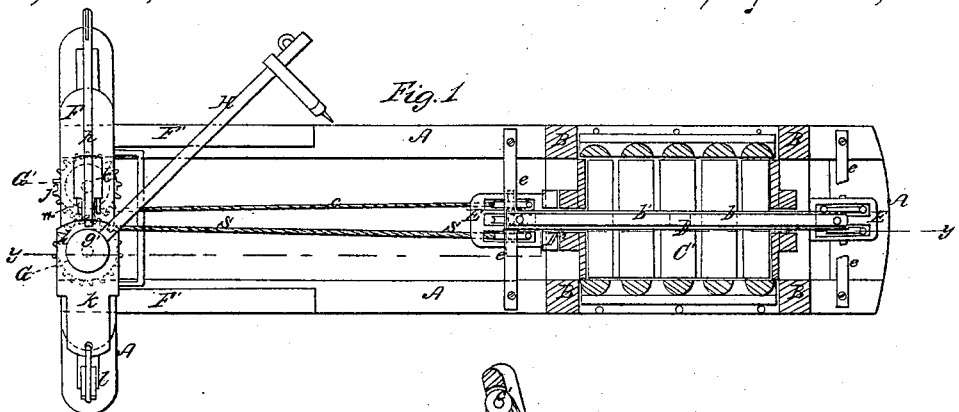
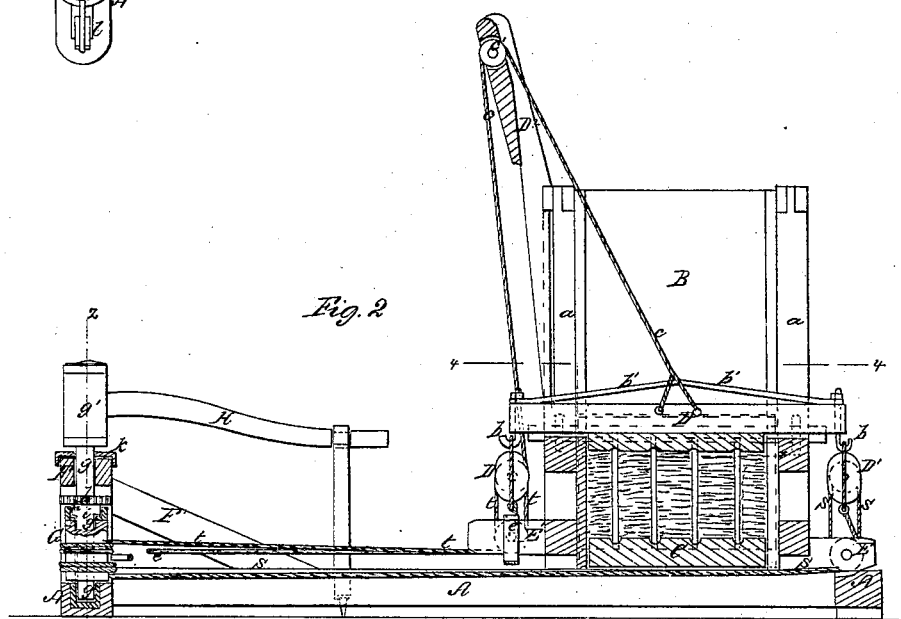
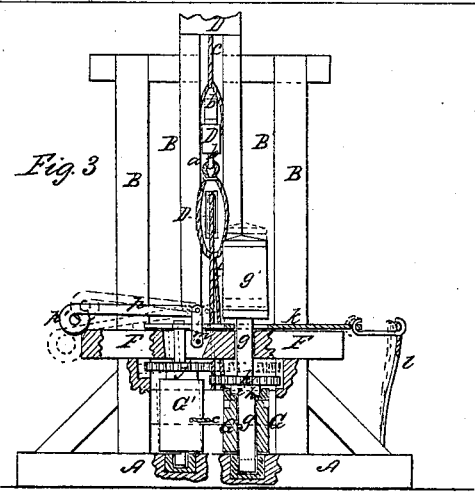
Witnesses:
J. W. Coombs
Geo Reed
Inventor;
Wilbur Read
per Munn & Co
attorneys
AM. PHOTO-LITHO. CO. N.Y. (OSBORNE'S PROCESS)

ced down to this follower-head C in varied directions, according to the direction they are to be wound on the drums G G'; but when they come down to the drums they are parallel with them, and wound around them.

UNITED STATES PATENT OFFICE.

WILBUR READ, OF GREENWOOD, CALIFORNIA.

IMPROVEMENT IN HAY AND COTTON PRESSES.

Specification forming part of Letters Patent No. 40,064, dated September 22, 1863; antedated October 17, 1862.

*To all whom it may concern:*

Be it known that I, WILBUR READ, of Greenwood, in the county of El Dorado and State of California, have invented a new and Improved Cotton and Hay Press; and I do hereby declare that the following is a full, clear, and exact description thereof, reference being had to the accompanying drawings, making a part of this specification, in which—

Figure 1 is a top view of the improved press and a horizontal section through the box thereof. Fig. 2 is a horizontal section through Fig. 1 in the vertical plane indicated by the course of red line *y y* thereon. Fig. 3 is an end elevation of the improved press, showing in section the bearings of the shafts of the two drums on which the ropes are alternately wound and unwound.

Similar letters of reference indicate corresponding parts in the three figures.

This invention relates to an improvement applying power to a cotton or hay press.

The object of the invention is to communicate the required alternate pressing and releasing movement to the follower of a cotton-press from the continued circular motion of a common sweep or lever to which a horse is attached, or to stop the movement of the follower at pleasure while the horse continues to walk in a circle.

To enable those skilled in the art to make and use my invention, I will proceed to describe its construction and operation.

A is the horizontal frame or base of the machine.

B B B B are four perpendicular posts projecting up from frame A, which are securely braced and tied together, for supporting the quadrangular press-box B', within which works the follower or pressing-head C.

C' is a flat board, which rests on frame A, and forms the bottom of the press-box. Two sides of the press-box B' are removable for supplying the box with cotton and removing the bales. This press-box and follower, it will be seen, are constructed similarly to those in common use.

A horizon-beam, D, passes transversely across the top of follower c, and is bolted to this follower. The ends of beam D project through narrow vertical openings *a a* in the sides of the press-box B', which allow the bar to receive a vertical movement; and on the extreme ends of beam D hooks *b b* are secured, to which the single pulley-blocks D' D' are attached. Over the top of beam D a strong iron brace, *b'*, is secured, to give additional strength to this beam, and to the midde of the beam D a rope or chain, c, is secured, as shown in Figs. 2 and 3 of the drawings. This rope c passes up from beam D, and is carried over a pulley, *c'*, in the upper end of a post, D², which is rigidly secured to one side of the press-box frame B, as shown in Fig. 1.

E E are two double pulley-blocks, which are rigidly secured down to frame A—one on each side of the press-box B', and directly under pulley-blocks D' D'. The straps *e e* are used to secure the blocks E E' down in their places. Through these four pulley-blocks D' D' and E E', which I have just described, ropes are passed, as will be hereinafter described, which ropes are operated so as to alternately draw up and pull down the follower-block C.

Frame A extends out some distance from the press, and on the opposite end of this frame A a perpendicular frame, F, is constructed and securely braced. This frame F should be made of heavy timber, and the inclined braces F' F' should be used to resist the strain put upon frame F. Within this frame F two drums, G G', have their bearings, as shown in Figs. 2 and 3 of the drawings. These drums stand in perpendicular positions, side by side, with a space between them. Through the drum G a shaft, *g*, passes, and has its bearings in the horizontal sill A and cross-beam F. The shaft turns loosely in drum G, and the upper end of this shaft *g* extends up some distance above beam F, and receives a hub, *g'*, which is keyed to the shaft *g*. To this hub *g'* a long horizontal sweep or lever, H, is secured, to the outer end of which a horse is to be hitched, and as he walks in a circle he turns the shaft *g*. Above the drum G and keyed to shaft *g* is a spur-wheel, *h*, having a hub portion, *h'*, formed on its lower side, which portion has a clutch-tooth, *i*, on it, that will engage with a similar tooth, which is formed on the top of drum G, when the shaft *g* is depressed, and thus connect the drum G with its shaft *g*; but when the shaft *g* is raised to the position indicated in red lines, Fig. 3 of the drawings, the drum G will not be coupled to its shaft nor be turned by it. The vertical drum G' has its lower end bearings in the sill A, and its upper end bearings in a sliding plate, k, which is placed on the beam F, and which is moved back and forth in a direction with the length of this beam by a short lever, m, which is shown in Fig. 3, and a spring-rod, l, also shown in Fig. 3. This movement of plate k just described is intended to engage the spur-wheel h on shaft g with a pinion spur-wheel, j, which is keyed to the upper end of drum G', or to disengage these two spur-wheels as it is found desirable by rocking the upper end of the drum G'.

To the upper end of the short upright lever m, which moves the plate k, as described, a horizontal lever, p, is pivoted, having a hook, p', on its outer end, which is hooked over the end of beam F when it is desired to keep the wheel j disengaged from wheel h. The end or arm of lever p opposite to the hooked end is used to raise the shaft g by catching it under the hub g', and thus disengaging the shaft g from its drum G. The shaft g passes through a large hole in sliding plate k, and when this shaft g has been raised by means of lever p the spring l draws the plate k under the shoulder of hub g' and keeps the shaft in an elevated position.

To the drum G' the rope or chain c is attached, which is carried off to the stationary pulley-block E' and passed under one of the pulleys in this block, thence up over pulley c' in post D², and thence to the follower C, to which this rope c is attached. Rope c is only used to draw up the follower-block C. A rope, s, is attached at one end to drum G, and passes off under the press and through the pulley-blocks E and D', and another rope, t, is attached at one end to the drum G, and carried off and passed through stationary block E' and block D'. The two ropes, s and t, which are attached to drum G, are used to draw down the follower with sufficient force to press the cotton, which is put in the press-box. G is therefore the pressing-drum and G' the releasing-drum; or, in other words, when the drum G winds up its ropes s and t the follower C is forcibly pulled down in the pressing-box B', and when the drum G' winds up its rope c the follower C is elevated in its press-box.

The operation of the entire machine is as follows: A horse is hitched to the sweep H and driven around in a circle in the direction indicated by the red arrow in Fig. 1 of the drawings. The lever p is forced down on top of the frame F, and its hook p' is caught over the end of the horizontal beam, on which it rests. This operation moves the sliding plate k forward and disengages the pinion-wheel j from wheel h. The shaft g is elevated, so that it is disengaged from the drum G, and with the parts thus adjusted the horse may be driven around and the shaft g will not operate upon either of the drums G or G'. The two removable sides of the press-box B' are taken out, the follower or pressing-head C being in an elevated state, and the necessary quantity of cotton to be pressed into a bale is packed into the press-box under the follower. The sides of box B', which were taken out, are now put back and secured in their places, and the operation of pressing the cotton in the box B' is conducted as follows: The hooked end of the lever p is released and the spring l draws plate k back and allows the shaft g to drop down, so that the tooth i on hub h' of spur-wheel h will be engaged with the drum G. This drum G will now be rotated, and as it winds up the ropes s and t these ropes will act upon both ends of the beam D and pull down the follower, which will press the cotton. The bale is now immediately bound with straps, and the follower C is elevated by depresing the long arm of lever p, and thus raising the shaft g and detaching this shaft from hub g', at the same time engaging the teeth of spur-wheel h with the pinion-wheel j, so that while the drum will allow the ropes s and t to unwind from it the gearing h and j will give motion to drum G, and wind the rope c upon it, thus drawing up the follower C. Now, as the follower C is being raised the press-box B' can be filled again, and when filled it can be brought down again by allowing the shaft g to drop, so that the tooth i on hub g' will engage with the drum G and thus rotate this drum G again, so as to wind up the ropes s and t. It will be understood that when the shaft g is in a position to rotate the drum G the spur-wheel h will not engage with wheel j, but will allow drum G to turn loosely with its shaft. The drums G and G' may in this manner, and by the above-described arrangement of parts, be made to alternately wind up and unwind their respective ropes while the horse continues to move round in a circle.

Having thus described my invention, what I claim as new, and desire to secure by Letters Patent, is—

Combining with the drums G and G', arranged as desbribed, the loose shaft g, with its lever H, spur-wheel h, with its toothed hub i, spur-wheel j, sliding plate k, levers m and p, all arranged substantially as set forth, and causing the drums G and G' to operate upon their respective ropes c and s t as herein specified.

WILBUR READ.

Witnesses:
JOHN M. MAY,
JOSEPH HENRY.